(12) United States Patent
Jenkins et al.

(10) Patent No.: US 12,165,532 B1
(45) Date of Patent: Dec. 10, 2024

(54) AUTONOMOUS CONTROL TECHNIQUES FOR AVOIDING COLLISIONS WITH COOPERATIVE AIRCRAFT

(71) Applicant: WING AVIATION LLC, Mountain View, CA (US)

(72) Inventors: Kevin Jenkins, Dallas, TX (US); John Mooney, Felton, CA (US); Louis Dressel, Foster City, CA (US); Kyle Julian, Palo Alto, CA (US)

(73) Assignee: Wing Aviation LLC, Palo Alto, CA (US)

( * ) Notice: Subject to any disclaimer, the term of this patent is extended or adjusted under 35 U.S.C. 154(b) by 171 days.

(21) Appl. No.: 17/581,518

(22) Filed: Jan. 21, 2022

(51) Int. Cl.
| | |
|---|---|
| *G08G 5/00* | (2006.01) |
| *B64U 10/20* | (2023.01) |
| *B64U 101/00* | (2023.01) |
| *G05D 1/00* | (2024.01) |
| *G08G 5/04* | (2006.01) |

(52) U.S. Cl.
CPC ........... *G08G 5/0069* (2013.01); *B64U 10/20* (2023.01); *G05D 1/106* (2019.05); *G08G 5/0021* (2013.01); *G08G 5/045* (2013.01); *B64U 2101/00* (2023.01); *B64U 2201/10* (2023.01)

(58) Field of Classification Search
None
See application file for complete search history.

(56) References Cited

U.S. PATENT DOCUMENTS

| | | | |
|---|---|---|---|
| 8,830,090 B2 | 9/2014 | Shafaat | |
| 9,405,005 B1 | 8/2016 | Arteaga | |
| 9,734,723 B1 * | 8/2017 | Bruno | G08G 5/006 |
| 10,410,532 B1 * | 9/2019 | Myr | G08G 5/0043 |
| 11,673,656 B2 * | 6/2023 | Kim | G08G 5/0056 |
| | | | 701/16 |
| 11,694,556 B2 * | 7/2023 | Chen | G08G 5/0013 |
| | | | 701/122 |
| 11,721,218 B2 * | 8/2023 | Zelenka | G08G 5/0069 |
| | | | 340/961 |

(Continued)

FOREIGN PATENT DOCUMENTS

| | | | | |
|---|---|---|---|---|
| WO | WO-2019148188 A1 * | 8/2019 | | B64C 1/36 |

OTHER PUBLICATIONS

Arteaga, R., et al., "µADS-B Detect and Avoid Flight Tests on Phantom 4 Unmanned Aircraft System", 21 pages.

(Continued)

*Primary Examiner* — Jean Paul Cass

(74) *Attorney, Agent, or Firm* — Christensen O'Connor Johnson Kindness PLLC

(57) ABSTRACT

In some embodiments, a non-transitory computer-readable medium having logic stored thereon is provided. The logic, in response to execution by one or more processors of an unmanned aerial vehicle (UAV), causes the UAV to perform actions comprising receiving at least one ADS-B message from an intruder aircraft; generating a intruder location prediction based on the at least one ADS-B message; comparing the intruder location prediction to an ownship location prediction to detect conflicts; and in response to detecting a conflict between the intruder location prediction and the ownship location prediction, determining a safe landing location along a planned route for the UAV and descending to land at the safe landing location.

20 Claims, 11 Drawing Sheets

(56) References Cited

U.S. PATENT DOCUMENTS

| | | | | |
|---|---|---|---|---|
| 2012/0143505 A1* | 6/2012 | Giovannini | .......... | G08G 5/0052 |
| | | | | 701/540 |
| 2015/0134150 A1* | 5/2015 | Farjon | .................... | G08G 5/045 |
| | | | | 701/3 |
| 2020/0027358 A1* | 1/2020 | Fine | ..................... | G08G 5/0021 |

OTHER PUBLICATIONS

Airspace-Encounter Models, "Bayesian Network Encounter Models," <https://github.com/Airspace-Encounter-Models/em-model-manned-bayes> [retrieved Nov. 12, 2021], 20 pages.

Di Vito, Vittorio, et al., "RPAS Automatic ADS-B Based Separation Assurance and Collision Avoidance System Real-Time Simulation Results", Drones, Dec. 7, 2020, pp. 1-25.

"ADS-B Collision Avoidance System", <https://github.io/desg.html> [retrieved Nov. 11, 2021], 1 page.

Arteaga, R., "Automatic Dependent Surveillance Broadcast: μADS-B Detect-and-Avoid Flight Tests", AIAA, SciTech Forum, Jan. 8-12, 2018, 53 pages.

Arteaga, R., "Automatic Dependent Surveillance Broadcast: ADS-B Sense-and-Avoid System", AIAA, Aviation, Jun. 13-17, 2016, 38 pages.

International Search Report and Written Opinion, mail date Nov. 6, 2023, in corresponding International Patent Application No. PCT/US2023/010669, 12 pages.

* cited by examiner

AUTONOMOUS CONTROL TECHNIQUES FOR AVOIDING COLLISIONS WITH COOPERATIVE AIRCRAFT

TECHNICAL FIELD

This disclosure relates generally to unmanned aerial vehicles (UAVs), and in particular but not exclusively, relates to autonomous control for UAVs.

BACKGROUND

The use of UAVs for various tasks, including but not limited to aerial imagery capture, product delivery, and other tasks, is growing increasingly common. Often, a fleet of UAVs is controlled by a central system that provides planned route information to UAVs which then autonomously navigate the planned routes. While the central system can attempt to ensure that none of the planned routes will conflict with each other (i.e., no UAV traversing a planned route will come within a safety margin of another UAV), the central system may not have information about other aircraft that are not part of the fleet of UAVs that may be present in an operating region for the fleet of UAVs, including but not limited to general aviation aircraft.

Automatic Dependent Surveillance-Broadcast, or ADS-B, is technology that allows an aircraft to broadcast information regarding its location, airspeed, heading, and other information. An aircraft equipped with an ADS-B Out service device will determine its location and other information using sensors on the aircraft, and will use the ADS-B device to transmit one or more messages with the information. These messages may be received by ADS-B In service devices carried by other aircraft, ground stations, and/or any ADS-B In service devices to allow the location of the transmitting aircraft to be determined.

BRIEF SUMMARY

In some embodiments, a non-transitory computer-readable medium is provided. The computer-readable medium has logic stored thereon that, in response to execution by one or more processors of an unmanned aerial vehicle (UAV), cause the UAV to perform actions that include receiving at least one ADS-B message from an intruder aircraft; generating a intruder location prediction based on the at least one ADS-B message; comparing the intruder location prediction to an ownship location prediction to detect conflicts; determining a safe landing location along a planned route for the UAV in response to detecting a conflict between the intruder location prediction and the ownship location prediction, and descending to land at the safe landing location.

In some embodiments, an unmanned aerial vehicle (UAV) is provided. The UAV includes an ADS-B receiver device, a first set of processing cores, a second set of processing cores, and at least one non-transitory computer-readable medium. The computer-readable medium has logic stored thereon that, in response to execution by the first set of processing cores, causes the first set of processing cores to execute a route traversal engine to autonomously control one or more propulsion devices of the UAV. The logic also, in response to execution by the second set of processing cores, causes the second set of processing cores to perform actions for predicting and avoiding collisions between the UAV and an intruder aircraft. The actions include receiving, via the ADS-B receiver device, at least one ADS-B message from the intruder aircraft; generating a intruder location prediction based on the at least one ADS-B message; comparing the intruder location prediction to an ownship location prediction to detect conflicts; and transmitting a notification of the conflict to the route traversal engine in response to detecting a conflict between the intruder location prediction and the ownship location prediction.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Embodiments of the present disclosure provide techniques for UAVs to receive and process ADS-B messages from other aircraft ("intruder aircraft") and to autonomously predict whether a conflict between the UAV and the intruder aircraft is likely to occur. Embodiments of the present disclosure also provide techniques for UAVs to autonomously react to predicted conflicts in ways that reliably avoid them. Such techniques allow for UAVs to reliably operate autonomously in a beyond visual line of sight (BVLOS) environment in which conflicts cannot be avoided using centralized control.

Figure 1:
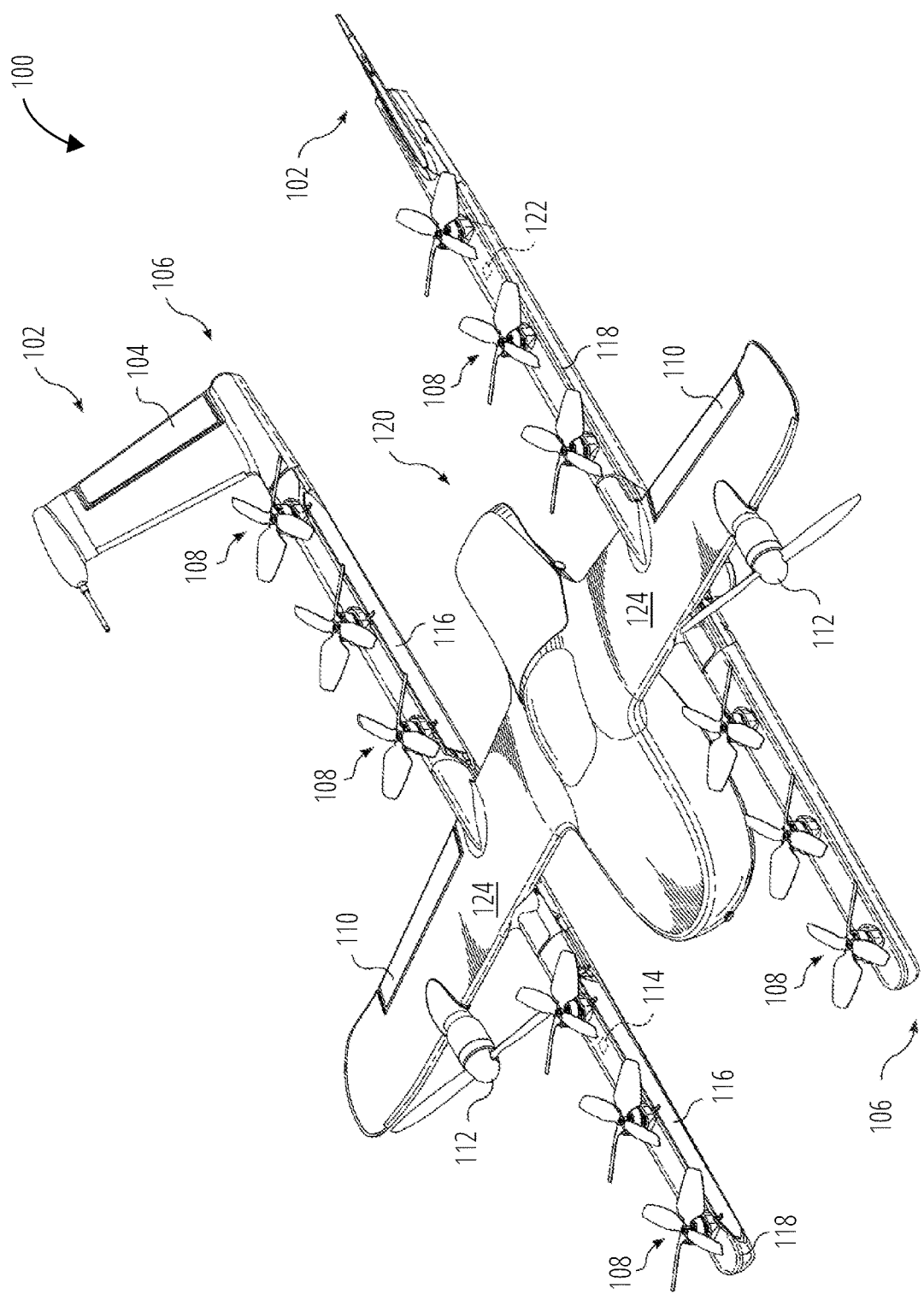
FIG. 1 and FIG. 2 illustrate a non-limiting example embodiment of aerial vehicle or UAV in accordance with various aspects of the present disclosure.
Figure 2:
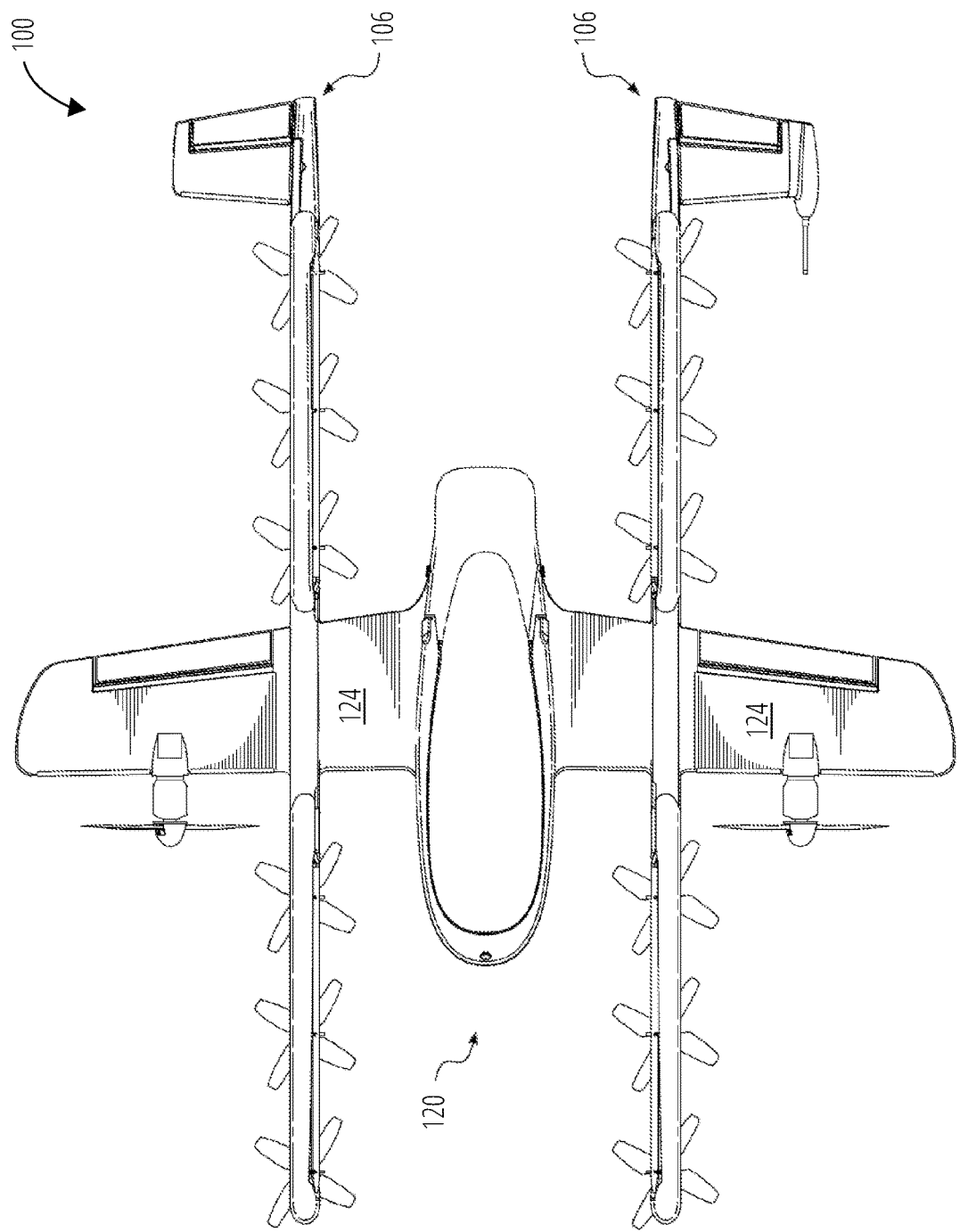

FIG. 1 and FIG. 2 illustrate a non-limiting example embodiment of aerial vehicle or UAV 100 in accordance with various aspects of the present disclosure. The illustrated embodiment of UAV 100 is a vertical takeoff and landing (VTOL) unmanned aerial vehicle (UAV) that includes separate propulsion units 112 and propulsion units 108 for providing horizontal and vertical propulsion, respectively. UAV 100 is a fixed-wing aerial vehicle, which as the name implies, has a wing assembly 124 that can generate lift based on the wing shape and the vehicle's forward airspeed when propelled horizontally by propulsion units 112. FIG. 1 is a perspective top view illustration of UAV 100 while FIG. 2 is a bottom side plan view illustration of UAV 100. In some embodiments, UAVs having different form factors, propulsion types, and/or other aspects may be used instead of the form factor of the illustrated UAV 100.

The illustrated embodiment of UAV 100 includes a fuselage 120. In one embodiment, fuselage 120 is modular and includes a battery module, an avionics module, and a mission payload module. These modules are detachable from each other and mechanically securable to each other to contiguously form at least a portion of the fuselage 120 or UAV main body.

Figure 3:
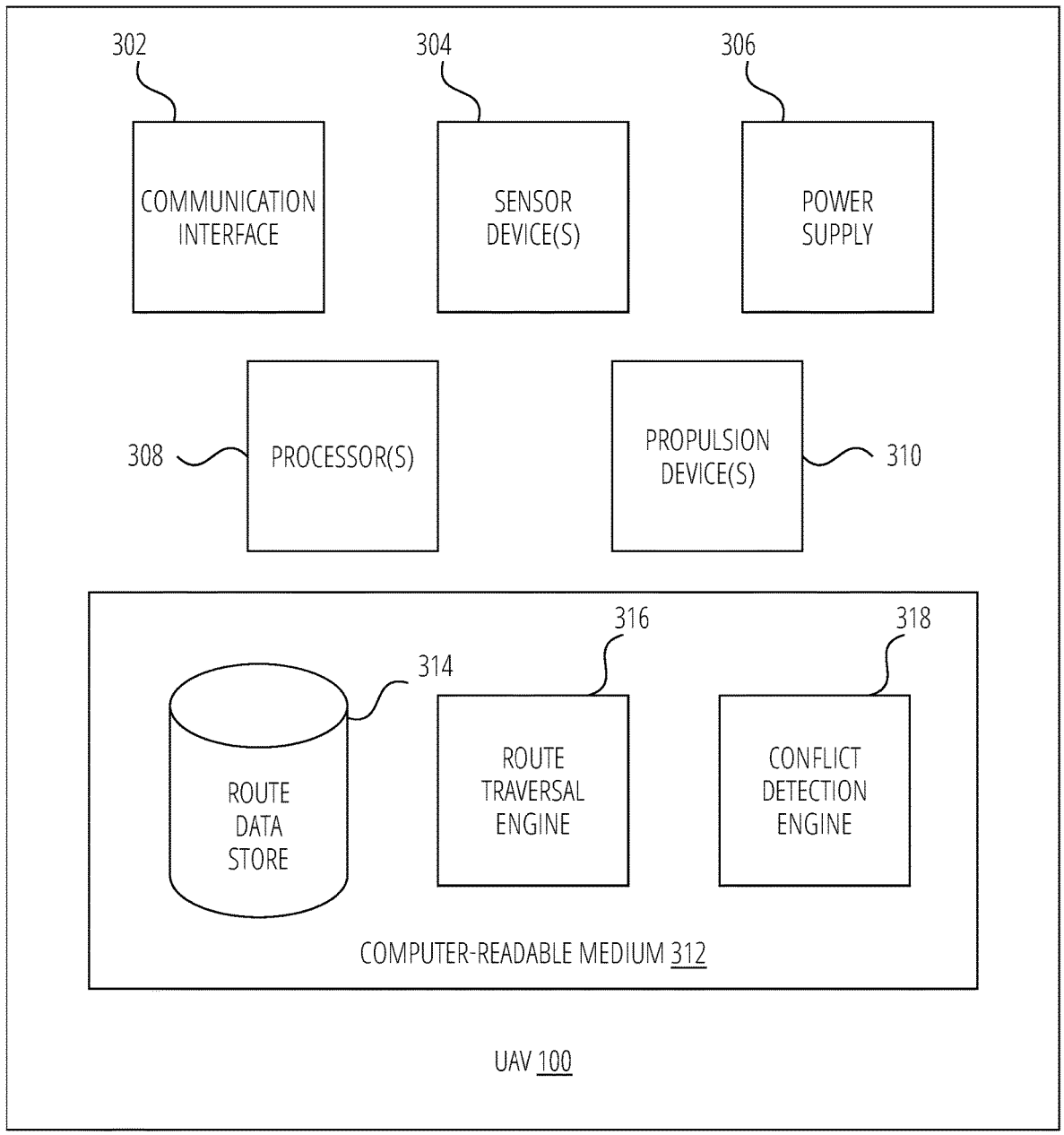
FIG. 3 is a block diagram that illustrates additional aspects of a non-limiting example embodiment of a UAV according to various aspects of the present disclosure.

The battery module includes a cavity for housing one or more batteries for powering UAV 100. The avionics module houses flight control circuitry of UAV 100, which may include one or more processors and memory, communication electronics and antennas (e.g., cellular transceiver, Wi-Fi transceiver, etc.), and various sensors (e.g., global positioning sensor, an inertial measurement unit (IMU), a magnetic compass, etc.). The mission payload module houses equipment associated with a mission of UAV 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.). Some of these (and other) components that may be carried by some embodiments of the UAV 100 are illustrated in FIG. 3.

The illustrated embodiment of UAV 100 further includes horizontal propulsion units 112 positioned on wing assembly 124, which can each include a motor, shaft, motor mount, and propeller, for propelling UAV 100. The illustrated embodiment of UAV 100 includes two boom assemblies 106 that secure to wing assembly 124.

The illustrated embodiments of boom assemblies 106 each include a boom housing 118 in which a boom is disposed, vertical propulsion units 108, printed circuit boards 116, and stabilizers 102. Vertical propulsion units 108 can each include a motor, shaft, motor mounts, and propeller, for providing vertical propulsion. Vertical propulsion units 108 may be used during a hover mode where UAV 100 is descending (e.g., to a delivery location) or ascending (e.g., following a delivery). Stabilizers 102 (or fins) may be included with UAV 100 to stabilize the UAV's yaw (left or right turns) during flight. In some embodiments, UAV 100 may be configured to function as a glider. To do so, UAV 100 may power off its propulsion units and glide for a period of time.

During flight, UAV 100 may control the direction and/or speed of its movement by controlling its pitch, roll, yaw, and/or altitude. For example, the stabilizers 102 may include one or more rudders 104 for controlling the UAV's yaw, and wing assembly 124 may include elevators for controlling the UAV's pitch and/or ailerons 110 for controlling the UAV's roll. As another example, increasing or decreasing the speed of all the propellers simultaneously can result in UAV 100 increasing or decreasing its altitude, respectively. The UAV 100 may also include components for sensing the environment around the UAV 100, including but not limited to audio sensor 122 and audio sensor 114. Further examples of sensor devices are illustrated in FIG. 3 and described below.

Many variations on the illustrated fixed-wing aerial vehicle are possible. For instance, aerial vehicles with more wings (e.g., an "x-wing" configuration with four wings), are also possible. Although FIG. 1 and FIG. 2 illustrate one wing assembly 124, two boom assemblies 106, two horizontal propulsion units 112, and six vertical propulsion units 108 per boom assembly 106, it should be appreciated that other variants of UAV 100 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

FIG. 3 is a block diagram that illustrates additional aspects of a non-limiting example embodiment of a UAV 100 according to various aspects of the present disclosure. As shown, the UAV 100 includes a communication interface 302, one or more sensor devices 304, a power supply 306, one or more processor(s) 308, one or more propulsion devices 310, and a computer-readable medium 312.

In some embodiments, the communication interface 302 includes hardware and software to enable any suitable communication technology for communicating with a central UAV fleet control system and/or other systems. In some embodiments, the communication interface 302 includes multiple communication interfaces, each for use in appropriate circumstances. For example, the communication interface 302 may include a long-range wireless interface such as a 4G or LTE interface, or any other type of long-range wireless interface (e.g., 2G, 3G, 5G, or WiMAX), to be used to communicate with the fleet control system while traversing a route. The communication interface 302 may also include a medium-range wireless interface such as a Wi-Fi interface to be used when the UAV 100 is at an area near a start location or an endpoint where Wi-Fi coverage is available. The communication interface 302 may also include a short-range wireless interface such as a Bluetooth interface to be used when the UAV 100 is in a maintenance location or is otherwise stationary and waiting to be assigned a route. The communication interface 302 may also include a wired interface, such as an Ethernet interface or a USB interface, which may also be used when the UAV 100 is in a maintenance location or is otherwise stationary and waiting to be assigned a route.

In some embodiments, the sensor devices 304 include one or more vehicle state sensor devices configured to detect states of various components of the UAV 100, and to transmit signals representing those states to other components of the UAV 100. Some non-limiting examples of vehicle state sensor devices include a battery state sensor and a propulsion device health sensor. In some embodiments, the sensor devices 304 include one or more environmental sensor devices configured to detect states of an environment surrounding the UAV 100. Some non-limiting examples of environmental sensor devices include a camera, a positioning system sensor device (such as a GPS sensor), a compass, an accelerometer, an altimeter, and an airspeed sensor device. In some embodiments, the sensor devices 304 may include an ADS-B receiver device configured to receive ADS-B In messages from other aircraft.

In some embodiments, the power supply 306 may be any suitable device or system for storing and/or generating power. Some non-limiting examples of a power supply 306 include one or more batteries, one or more solar panels, a fuel tank, and combinations thereof. In some embodiments, the propulsion device 310 may include any suitable devices for causing the UAV 100 to travel along the path. For an aircraft, the propulsion device 310 may include devices such as, but not limited to, one or more motors, one or more propellers, and one or more flight control surfaces. For a wheeled vehicle, the propulsion device 310 may include devices such as, but not limited to, one or more motors, one or more wheels, and one or more steering mechanisms.

In some embodiments, the processor(s) 308 may include any type of computer processor capable of receiving signals from other components of the UAV 100 and executing instructions and/or logic stored on the computer-readable medium 312. In some embodiments, the computer-readable medium 312 may include one or more devices capable of storing information, instructions, and/or logic for access by the processor(s) 308. In some embodiments, the computer-readable medium 312 may include one or more of a hard drive, a flash drive, an EEPROM, and combinations thereof.

In some embodiments, the processors may include any suitable type of general-purpose computer processor. In some embodiments, the processors may include one or more special-purpose computer processors or AI accelerators optimized for specific computing tasks, including but not limited to graphical processing units (GPUs), vision processing units (VPTs), and tensor processing units (TPUs).

As shown, the computer-readable medium 312 has stored thereon a route data store 314, a route traversal engine 316, and a conflict detection engine 318. In some embodiments, the route traversal engine 316 is configured to cause the propulsion devices 310 to propel the UAV 100 through planned routes stored in the route data store 314, and to take action to avoid conflicts detected by the conflict detection engine 318. The route traversal engine 316 may use signals from other devices, such as GPS sensor devices, vision-based navigation devices, accelerometers, LIDAR devices, and/or other devices that are not illustrated or described further herein, to assist in positioning and navigation as is typical for a UAV 100. In some embodiments, the conflict detection engine 318 is configured to use ADS-B messages received by the ADS-B receiver device to detect conflicts with other aircraft, and to alert the route traversal engine 316 when conflict avoidance maneuvers should be performed.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; an EEPROM; random-access memory (RAM); read-only memory (ROM); a CD-ROM, a DVD, or other disk storage; a magnetic cassette; a magnetic tape; and a magnetic disk storage.

As used herein, "engine" refers to logic embodied in hardware or software instructions, which can be written in one or more programming languages, including but not limited to C, C++, C #, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

In some embodiments, the processor(s) 308 may include a first set of one or more processors and/or processing cores that are designated for a first purpose, and a second set of one or more processors and/or processing cores that are designated for a second purpose, such that processing by the second set of processors/processing cores does not impact the performance of processing by the first set of processors/processing cores. For example, in some embodiments, the first set of one or more processors and/or processing cores may be configured to execute the route traversal engine 316, and the second set of one or more processors and/or processing cores may be configured to execute the conflict detection engine 318, such that processing power used to execute the conflict detection engine 318 does not impact the ability of the route traversal engine 316 to autonomously control the UAV 100.

Figure 4:
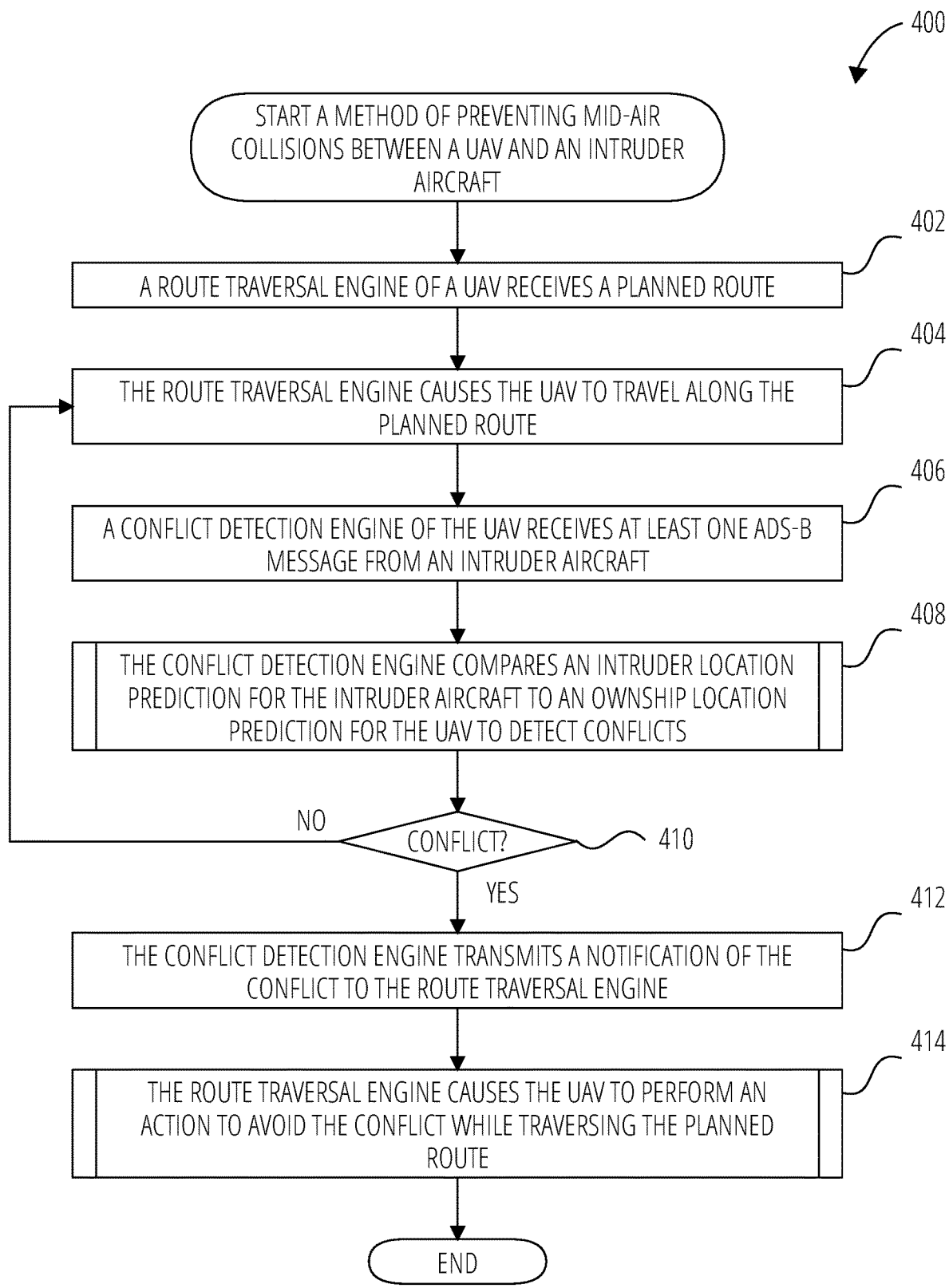
FIG. 4 is a flowchart that illustrates a non-limiting example embodiment of a method of preventing mid-air collisions between a UAV and an intruder aircraft according to various aspects of the present disclosure.

FIG. 4 is a flowchart that illustrates a non-limiting example embodiment of a method of preventing mid-air collisions between a UAV and an intruder aircraft according to various aspects of the present disclosure. In the method 400, the UAV receives ADS-B messages from intruder aircraft, determines whether predicted locations for the UAV coincide with predicted locations for the intruder aircraft to detect conflicts, and if a conflict is detected, the UAV takes an avoidance action.

From a start block, the method 400 proceeds to block 402, where a route traversal engine 316 of a UAV 100 receives a planned route. In some embodiments, the route traversal engine 316 saves the planned route in the route data store 314. The route traversal engine 316 may receive the planned route from a fleet management system via wireless communication, wired communication, or any other suitable technique, such that the fleet management system may reserve areas of airspace during the planned route to prevent conflicts between UAVs managed by the fleet management system. However, this embodiment should not be seen as limiting. In some embodiments, the planned route may be transmitted to the route traversal engine 316 via a different type of system, including but not limited to a controller terminal. In some embodiments, the planned route may include one or more waypoints indicating locations the UAV 100 should travel through to follow the planned route. In some embodiments, the planned route may include an end location, and the route traversal engine 316 may autonomously determine a planned route to reach the end location.

At block 404, the route traversal engine 316 causes the UAV 100 to travel along the planned route. In some embodiments, the route traversal engine 316 uses signals from the sensor devices 304, such as GPS location signals, aerial camera imagery, and so on, to autonomously control the propulsion devices 310 to cause the UAV 100 to travel along the planned route.

Figure 5:
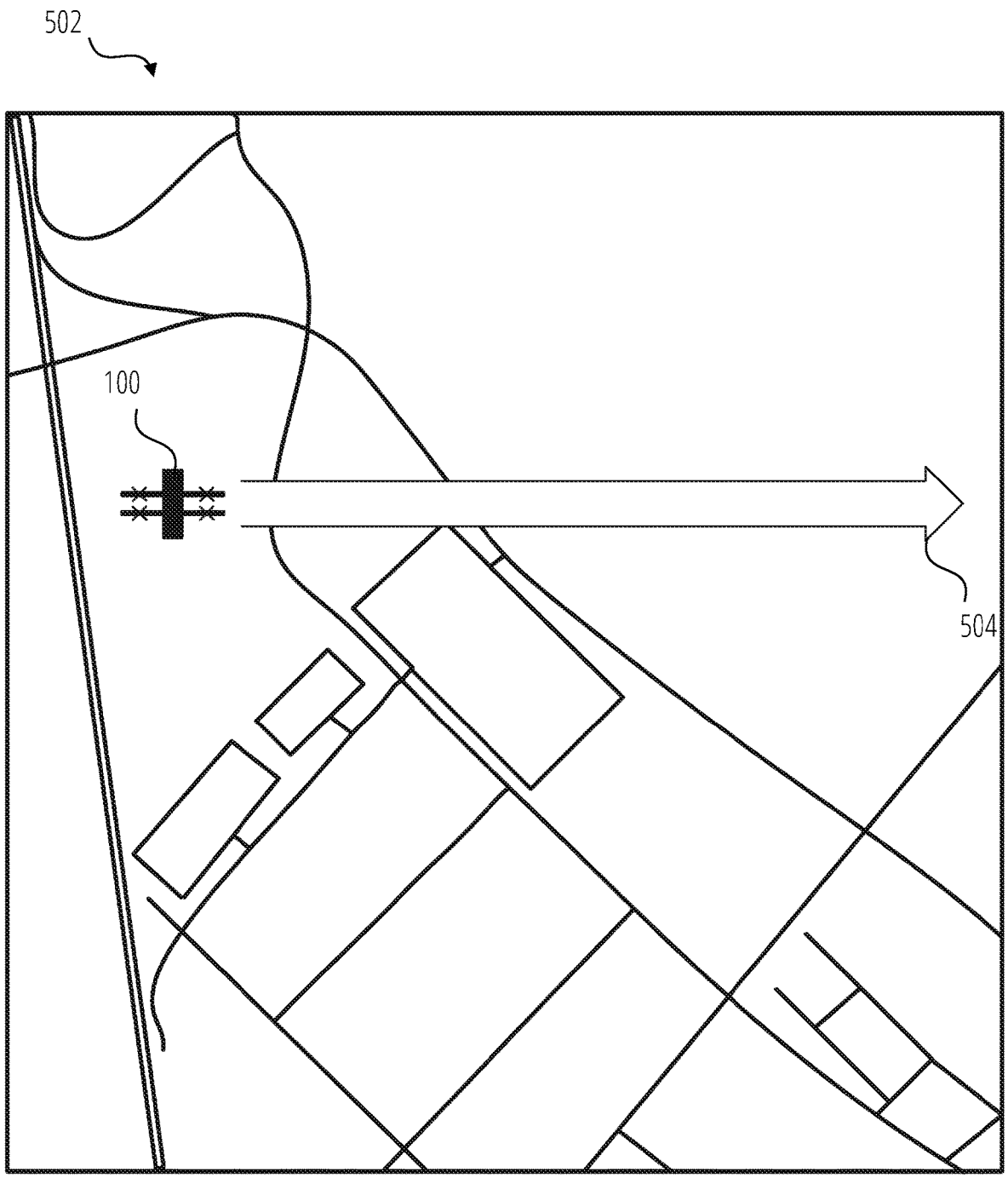
FIG. 5 is a schematic drawing of an operational area for a UAV according to various aspects of the present disclosure.

FIG. 5 is a schematic drawing of an operational area for a UAV according to various aspects of the present disclosure. As shown, the UAV 100 is present in an operational area 502 that includes a number of roads and some open space. The UAV 100 has received a definition of a simple planned route, (illustrated as planned route 504) which traverses the operational area 502 from west to east. As shown in FIG. 5, the UAV 100 is the only relevant aircraft in the operational area 502, and so the UAV 100 is traversing the planned route normally.

Figure 6:
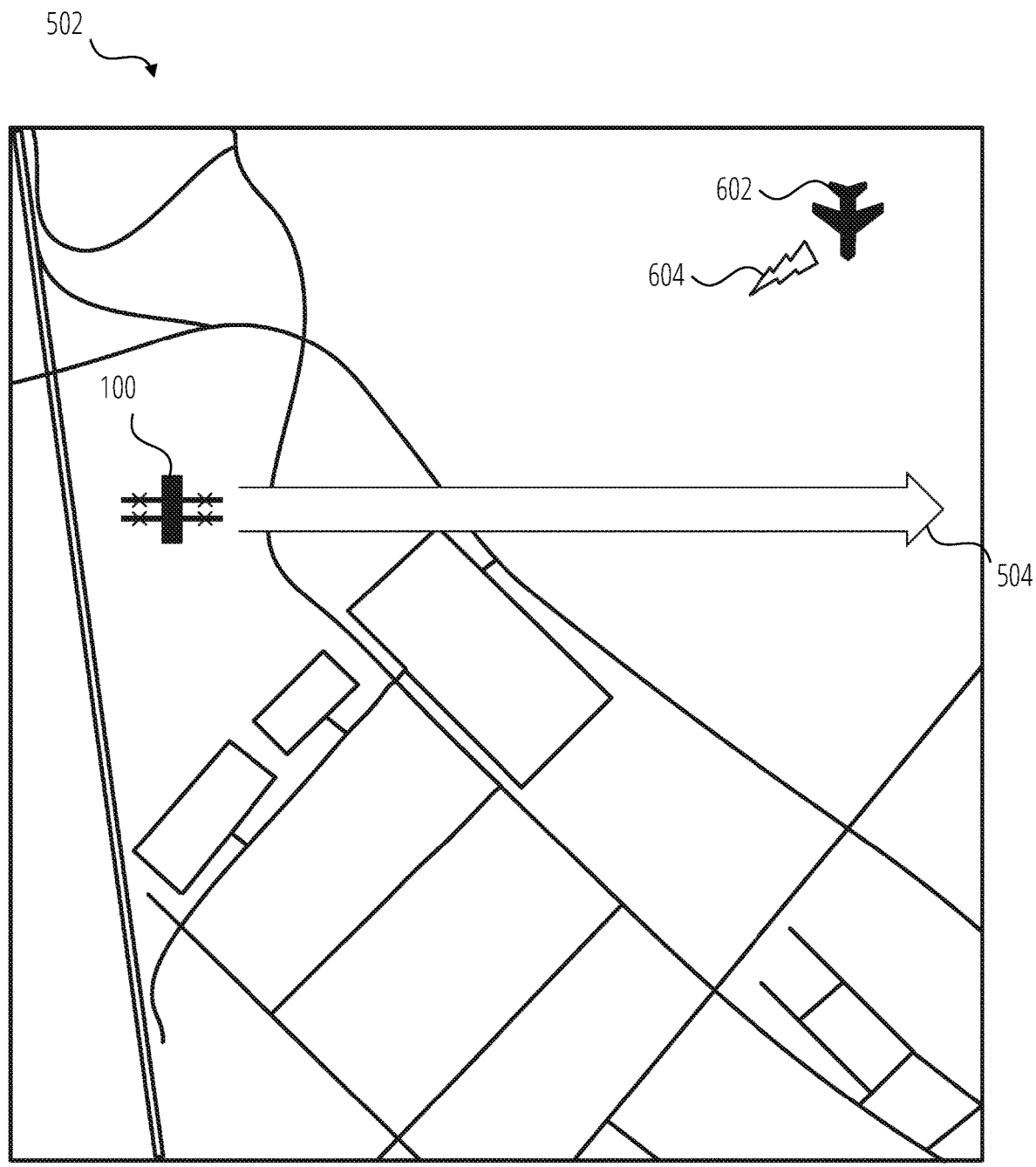
FIG. 6 is a schematic drawing that illustrates an intruder aircraft entering the operational area illustrated in FIG. 5.

Returning to FIG. 4, at block 406, a conflict detection engine 318 of the UAV 100 receives at least one ADS-B message from an intruder aircraft. The ADS-B message may be received by a sensor device 304 of the UAV 100 and provided to the conflict detection engine 318. FIG. 6 is a schematic drawing that illustrates an intruder aircraft entering the operational area illustrated in FIG. 5. As shown, the intruder aircraft 602 transmits at least one ADS-B message 604, which may be received by the UAV 100.

The term "intruder aircraft" simply denotes an aircraft that is not the UAV 100 to distinguish it from the UAV 100, which is also referred to in the method 400 as an "ownship" to distinguish it from the "intruder aircraft." In some embodiments, the at least one ADS-B message includes information from which a current location and/or future locations of the intruder aircraft may be determined, including but not limited to latitude, longitude, altitude, speed, heading, and climb rate. In some embodiments, the at least one ADS-B message may also include information that may be used to identify the intruder aircraft and to disambiguate the intruder aircraft from other aircraft, including but not limited to a call sign and an aircraft type (e.g., fixed wing vs rotary wing). In some embodiments, the UAV 100 may re-transmit the ADS-B message to the fleet management system to allow the fleet management system to generate planned routes for other controlled UAVs in the fleet that avoid predictable locations for intruder aircraft.

In some embodiments, the conflict detection engine 318 may process every ADS-B message that it receives through the remainder of the method 400. In some embodiments, the conflict detection engine 318 may filter received ADS-B messages and only process ADS-B messages that indicate that the intruder aircraft is within an encounter cylinder. In some embodiments, a size of the encounter cylinder may be based on expected capabilities of intruder aircraft within the operational area 502 and capabilities of the UAV 100. As a non-limiting example, it may be assumed that intruder aircraft will be general aviation craft capable of travelling at 250 kts maximum speed, while the UAV 100 is capable of a 42 m/s max speed (30 m/s with a maximum 12 m/s tailwind) and a 2 m/s$^2$ deceleration. In order to avoid a near-mid air collision (NMAC) separation distance of 500 ft, an encounter cylinder with a radius of 2.25 NM and a height of 1500 ft may be used to ensure that the UAV 100 has time to maneuver to avoid the intruder aircraft by more than the NMAC separation distance.

In some embodiments, the conflict detection engine 318 may process the incoming ADS-B messages in order to improve reliability of predictions based thereon. For example, the conflict detection engine 318 may use pre-takeoff barometer measurements compared to expected barometric pressures form online sources to calibrate altimeter readings. Errors in detected barometric pressure based on sensed temperature and readings from other related sensors may also be determined to correct the altitude determined by the sensor devices 304. These calibrated altimeter readings may be used to improve both ownship location predictions and altitude readings received in ADS-B messages. In some embodiments, the conflict detection engine 318 may apply criteria to determine when information reported in a given ADS-B message is valid before processing the ADS-B message.

Returning to FIG. 4, the method 400 proceeds from block 406 to subroutine block 408, where a procedure is conducted wherein the conflict detection engine 318 compares an intruder location prediction for the intruder aircraft to an ownship location prediction for the UAV 100 to detect conflicts. Any suitable procedure for detecting conflicts based on the at least one ADS-B message may be used, including but not limited to the procedure illustrated in FIG. 7 and described in detail below.

At decision block 410, a determination is made regarding whether the procedure conducted at subroutine block 408 detected any conflicts. If no conflicts were detected, then the result of decision block 410 is NO, and the method 400 returns to block 404 to continue to travel along the planned route. In some embodiments, the method 400 may continue at block 404 until either another ADS-B message is received (in which case the method 400 proceeds from block 404 to block 406 and on), or until travel along the planned route is completed (in which case the method 400 terminates). In some embodiments, the method 400 may update its predictions in subroutine block 408 multiple times for each time the method 400 returns to block 404. For example, the subroutine block 408 may be executed at a first rate, such as 4 hz, while ADS-B messages may be transmitted by a given intruder aircraft at a rate of 1 hz. This may be useful in that the ownship location prediction may be based on information retrieved by the sensor devices 304 that is updated more frequently than 1 hz.

Returning to decision block 410, if a conflict was detected, then the result of decision block 410 is YES, and the method 400 advances to block 412, where the conflict detection engine 318 transmits a notification of the conflict to the route traversal engine 316. The method 400 then advances to subroutine block 414, where a procedure is conducted wherein the route traversal engine 316 causes the UAV 100 to perform an action to avoid the conflict while traversing the planned route. Any suitable procedure for avoiding the conflict while traversing the planned route may be used, including but not limited to the procedure illustrated in FIG. 10 and described in detail below.

The method 400 then proceeds to an end block and terminates. One will recognize that although the method 400 is described as receiving an ADS-B message from a single intruder aircraft, in some embodiments, the conflict detection engine 318 may receive ADS-B messages from multiple intruder aircraft and may compare intruder location predictions for the multiple intruder aircraft to the ownship location prediction, and the result of decision block 410 may be YES if a conflict is detected for any one of the multiple intruder aircraft. Further, though the method 400 as illustrated shows the notification of the conflict being transmitted to the route traversal engine 316 as soon as the conflict is detected, in some embodiments, the conflict detection engine 318 may detect an existence of a future conflict, and may continue to monitor the existence of the future conflict until a time when an avoidance action has to be taken in order to avoid the conflict, at which point the conflict detection engine 318 will transmit the notification of the conflict to the route traversal engine 316. By monitoring the existence of the future conflict until the time when the avoidance action has to be taken, the UAV 100 can avoid taking avoidance actions in response to low-likelihood conflicts that turn out to be resolved before the avoidance action has to be taken.

Figure 7:
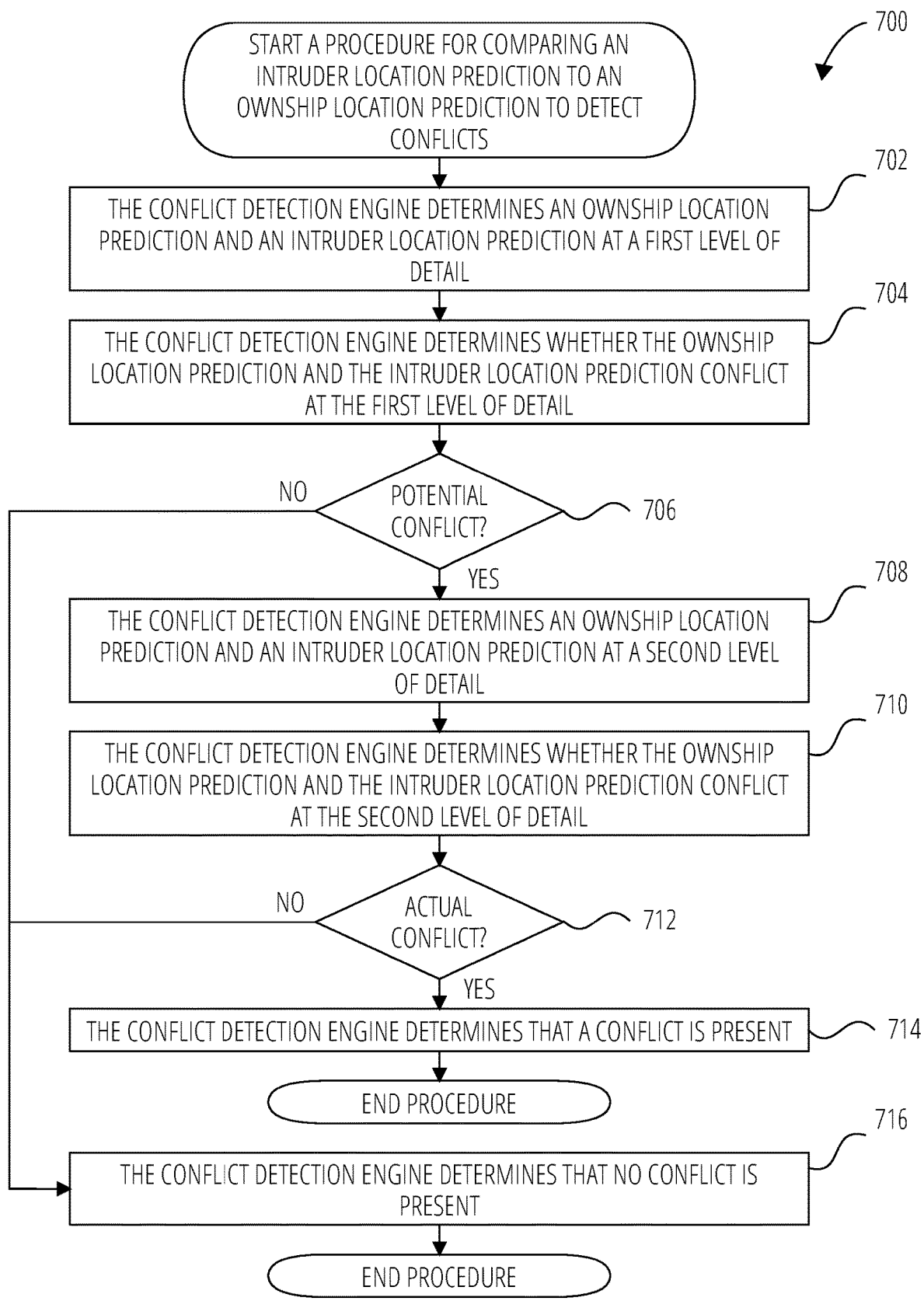
FIG. 7 is a flowchart that illustrates a non-limiting example embodiment of a procedure for comparing an intruder location prediction to an ownship location prediction to detect conflicts according to various aspects of the present disclosure.

FIG. 7 is a flowchart that illustrates a non-limiting example embodiment of a procedure for comparing an intruder location prediction to an ownship location prediction to detect conflicts according to various aspects of the present disclosure. The procedure 700 is a non-limiting example of a procedure suitable for use at subroutine block 408 of method 400 described above.

In the procedure 700, one or more intruder location predictions are generated for an intruder aircraft, one or more ownship location predictions are generated for an executing UAV (the "ownship"), and the intruder location predictions and ownship location predictions are analyzed for overlaps to detect conflicts. In the illustrated embodiment, predictions are first generated using a first level of detail, and if a potential conflict is detected at the first level of detail, then additional predictions are generated using a second level of detail to detect an actual conflict. By using two levels of detail, the conflict detection engine 318 can use a more easily computed technique for the first level of detail to conserve computing resources and thereby increase battery life/range for the UAV 100, while still having a more processing-intensive technique available for the second level of detail to ensure that actual conflicts are detected accurately. Using a more easily computed technique for the first level of detail may also allow the conflict detection engine 318 to concurrently process ADS-B messages from more intruder aircraft in crowded airspace when desired.

From a start block, the procedure 700 advances to block 702, where the conflict detection engine 318 determines an ownship location prediction and an intruder location prediction at a first level of detail. In some embodiments, the ownship location prediction may be based on a current location of the UAV 100 as determined using one or more sensor devices 304, and based on the planned route being traversed. In some embodiments, the ownship location prediction may be based solely on the planned route, which includes times at which the UAV 100 is intended to be at various locations. In some embodiments, the ownship location prediction may be based on additional information, such as a prediction of windspeed experienced by the UAV 100 that is generated by the UAV 100 from information gathered by one or more sensor devices 304.

Any suitable technique may be used to generate the intruder location prediction. In some embodiments, the conflict detection engine 318 may assume that the intruder aircraft will continue to travel in a straight line until a prediction threshold duration time (a limited amount of time for which locations are predicted). Even among such embodiments, multiple different techniques may be used to generate the predictions. As one non-limiting example, the conflict detection engine 318 may use a location (including latitude, longitude, and altitude), a heading, and a rate of climb from a single ADS-B message to determine a vector for the intruder aircraft, and may use the vector and an airspeed from the single ADS-B message to generate the intruder location prediction. As another non-limiting example, the conflict detection engine 318 may determine a first location (including latitude, longitude, and altitude) from a first ADS-B message and determine a second location (including latitude, longitude, and altitude) from a second ADS-B message, and extrapolate a line through the first location and the second location to generate the intruder location prediction.

In some embodiments, the conflict detection engine 318 may perform more complex computations to generate the intruder location prediction that do not assume that the intruder aircraft will continue to travel in a straight line. As one non-limiting example, the conflict detection engine 318 may use a vector for the intruder aircraft as determined from a first ADS-B message as discussed above, and may use a model of performance of the intruder aircraft to determine a reachable volume (a set of points in space that, given the model of performance of the intruder aircraft, the intruder aircraft could reach given the vector). The entire reachable volume (or a portion thereof) may then be used as the intruder location prediction. As another non-limiting example, a more complex model of intruder aircraft behavior, such as a Bayesian network encounter model trained using aircraft operational data, may be used. For models that do not assume that the intruder aircraft will continue to travel in a straight line, probabilities may be generated for multiple different points or volumes. For example, a Bayesian network encounter model may indicate that trajectories along an initial vector are more likely than trajectories along curved paths, and so multiple predicted locations with different probabilities may be generated for the initial vector and the curved paths.

In some embodiments, determining the ownship location prediction and the intruder location prediction at the first level of detail may constitute determining a volume in which each of the ownship and the intruder aircraft are predicted to be. In some embodiments, locations within the volume may be considered a location prediction at a consistent probability. In some embodiments, locations within the volume may be associated with different probabilities.

Figure 8:
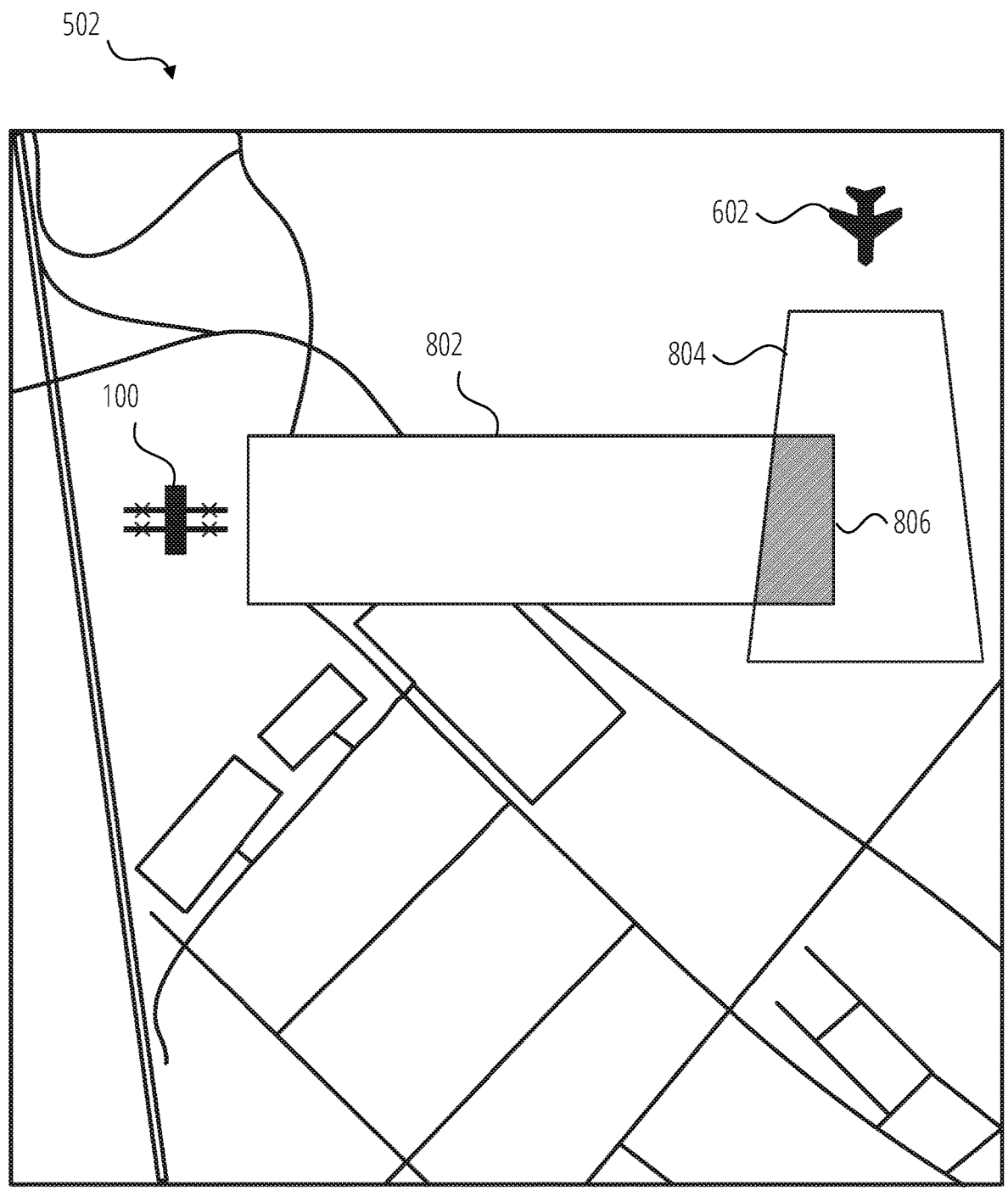
FIG. 8 is a schematic drawing that illustrates a volume-based technique for generating an ownship location prediction and an intruder location prediction according to various aspects of the present disclosure.

FIG. 8 is a schematic drawing that illustrates a volume-based technique for generating an ownship location prediction and an intruder location prediction according to various aspects of the present disclosure. As shown, a first prediction volume 802 is generated as the ownship location prediction and a second prediction volume 804 is generated as the intruder location prediction. Each prediction volume indicates a volume in which the associated aircraft is predicted to be between a current time and a prediction threshold duration time.

In the illustrated embodiment, the first prediction volume 802 includes straight sides such that the first prediction volume 802 is a rectangular prism, while the second prediction volume 804 is a trapezoidal prism. This reflects the heightened knowledge that the UAV 100 has of its planned route, such that the uncertainty of the ownship location prediction does not significantly increase over time, while the uncertainty of the intruder location prediction does increase over time.

Though the illustration in FIG. 8 provides a top-down view of the prediction volumes, one will recognize that each prediction volume may also have a height. In some embodiments, the height may be ignored and any overlap in positions may be considered a conflict. However, it may be beneficial for the prediction volumes to include heights that provide predicted maximum and minimum altitudes, since conflicts may be avoided with adequate vertical separation and it is desirable to avoid taking corrective action unless doing so would avoid an actual conflict.

Figure 9:
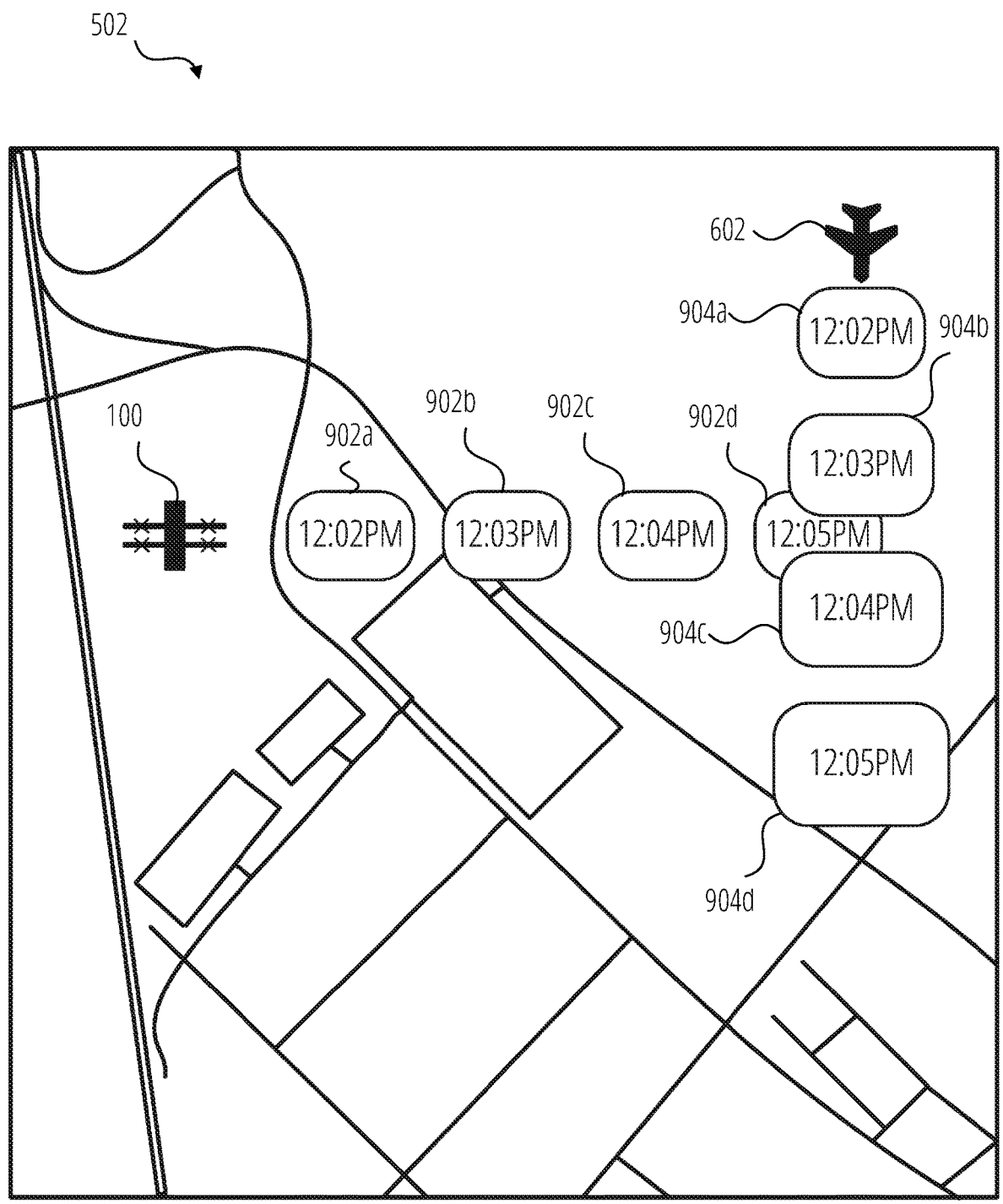
FIG. 9 is a schematic drawing that illustrates a point-based technique for generating an ownship location prediction and an intruder location prediction according to various aspects of the present disclosure.

In some embodiments, determining the ownship location prediction and the intruder location prediction at the first level of detail may constitute determining predicting specific locations at specific times for the ownship and the intruder aircraft. FIG. 9 is a schematic drawing that illustrates a point-based technique for generating an ownship location prediction and an intruder location prediction according to various aspects of the present disclosure. As shown, a set of predicted ownship locations 902a-902d are generated as the ownship location prediction, and a set of predicted intruder locations 904a-904d are generated as the intruder location prediction. Each predicted location is a predicted point (e.g., latitude, longitude, and altitude) at a given time.

The predicted specific locations are predicted at specific times that are separated by an interval. In the illustrated embodiment, the predicted locations are determined at one-minute intervals for a prediction threshold duration time of four minutes. The illustrated one-minute intervals are used herein for the ease of description only, and in actual embodiments are likely to be smaller. In some embodiments, the interval separating the specific times may be one second, a fraction of a second, or a different time interval.

In some embodiments, each predicted location also includes a safety boundary around the predicted location. In the illustrated embodiment, the safety boundaries of each of the predicted ownship locations 902a-902d is of the same size to reflect the consistent confidence in the ownship location prediction, while the safety boundaries of the predicted intruder locations 904a-904d grow over time to reflect the increased uncertainty in the intruder location prediction over time.

The intruder location predictions of FIG. 9 are based on the assumption that the intruder aircraft 602 continues in a straight line. As discussed above, in other embodiments, multiple potential paths for the intruder aircraft 602 may be used, in which case each predicted intruder location may also be associated with a probability.

Returning to FIG. 7, at block 704, the conflict detection engine 318 determines whether the ownship location prediction and the intruder location prediction conflict at the first level of detail. The technique used for determining whether there is a conflict depends on the format for the predictions. For example, if volume-based predictions are generated (as illustrated in FIG. 8), then the conflict detection engine 318 may compare the first prediction volume 802 for the ownship location prediction and the second prediction volume 804 for the intruder location prediction to determine if there is any intersection between the volumes. For example, FIG. 8 illustrates an area of overlap 806 between the first prediction volume 802 and second prediction volume 804, which would indicate that a potential conflict was detected. As another example, if point-based predictions are generated (as illustrated in FIG. 9), then the conflict detection engine 318 may compare each point for each given time to each other, along with their associated safety boundaries (e.g., comparing predicted ownship location 902a to predicted intruder location 904a, comparing predicted ownship location 902b to predicted intruder location 904b, and so on) to determine if any points intersect. FIG. 9 illustrates points that do overlap (predicted ownship location 902d overlaps with predicted intruder location 904b and predicted intruder location 904c), but because these points are for different times, a potential conflict would not be detected. In embodiments wherein probabilities are associated with various points in the intruder location prediction, a conflict may be detected if an overlap is detected and probabilities associated with the overlapping area for the ownship location prediction and the intruder location prediction sum to greater than a predetermined threshold.

The procedure 700 then advances to decision block 706, where a determination is made based on whether a conflict was detected at the first level of detail, thereby indicating a potential conflict. If no conflict was detected at the first level of detail, then the result of decision block 706 is NO, and the procedure 700 advances to an end block and reports back to its caller that no conflict was detected. Otherwise, if a conflict was detected at the first level of detail, then the result of decision block 706 is YES, and the procedure 700 advances to block 708.

At block 708, the conflict detection engine 318 determines an ownship location prediction and an intruder location prediction at a second level of detail, and at block 710, the conflict detection engine 318 determines whether the ownship location prediction and the intruder location prediction conflict at the second level of detail. The first level of detail and the second level of detail may use different techniques that use different amounts of computing resources, such that a lower level of computing resources may be used for the first level of detail before using a higher level of computing resources for the second level of detail.

In some embodiments, matching techniques may be used for the first level of detail and the second level of detail, but with different levels of precision. For example, the computation at the first level of detail and the second level of detail may both compare volumes as illustrated in FIG. 8, with the first level of detail using a lower refresh rate for the computation than the second level of detail. As another example, the computation at the first level of detail and the second level of detail may both compare individual locations as illustrated in FIG. 9, with the first level of detail using a longer amount of time between successive location predictions than the second level of detail.

In some embodiments, different techniques may be used for the first level of detail and the second level of detail. For example, the computation at the first level of detail may be a comparison of volumes as illustrated in FIG. 8, while the computation at the second level of detail may be a comparison of individual locations as illustrated in FIG. 9. As another example, the computation at the first level of detail may be a comparison of volumes as illustrated in FIG. 8, while the computation at the second level of detail may include a calculation of probabilities within the volumes and a summation of the probabilities in the overlapping volume to detect conflicts.

The procedure 700 then advances to decision block 712, where a determination is made based on whether a conflict was detected at the second level of detail, thereby indicating an actual conflict. If a conflict was detected, then the result of decision block 712 is YES, and the procedure 700 advances to block 714. At block 714, the conflict detection engine 318 determines that a conflict is present, and reports the conflict back to its caller before proceeding to an end block and terminating.

Returning to decision block 712, if a conflict was not detected, then the result of decision block 712 is NO, and the procedure 700 advances to block 716. At block 716, the conflict detection engine 318 determines that no conflict is present, and reports the lack of a conflict back to its caller before proceeding to an end block and terminating.

The embodiment illustrated in FIG. 7 uses a detected conflict at the first level of detail to determine whether to use the second level of detail. This embodiment is an example only, and in other embodiments, different or additional criteria could be used to advance from the first level of detail to the second level of detail. For example, in some embodiments, a first level of detail may be used for intruder aircraft currently outside of a given proximity threshold, and a second level of detail may be used for intruder aircraft currently inside the given proximity threshold. As another example, in some embodiments, a first level of detail may be used for intruder aircraft having a probability of a conflict that is below a given probability threshold, and a second level of detail may be used for intruder aircraft having a probability of conflict that is greater than the given probability threshold.

Figure 10:
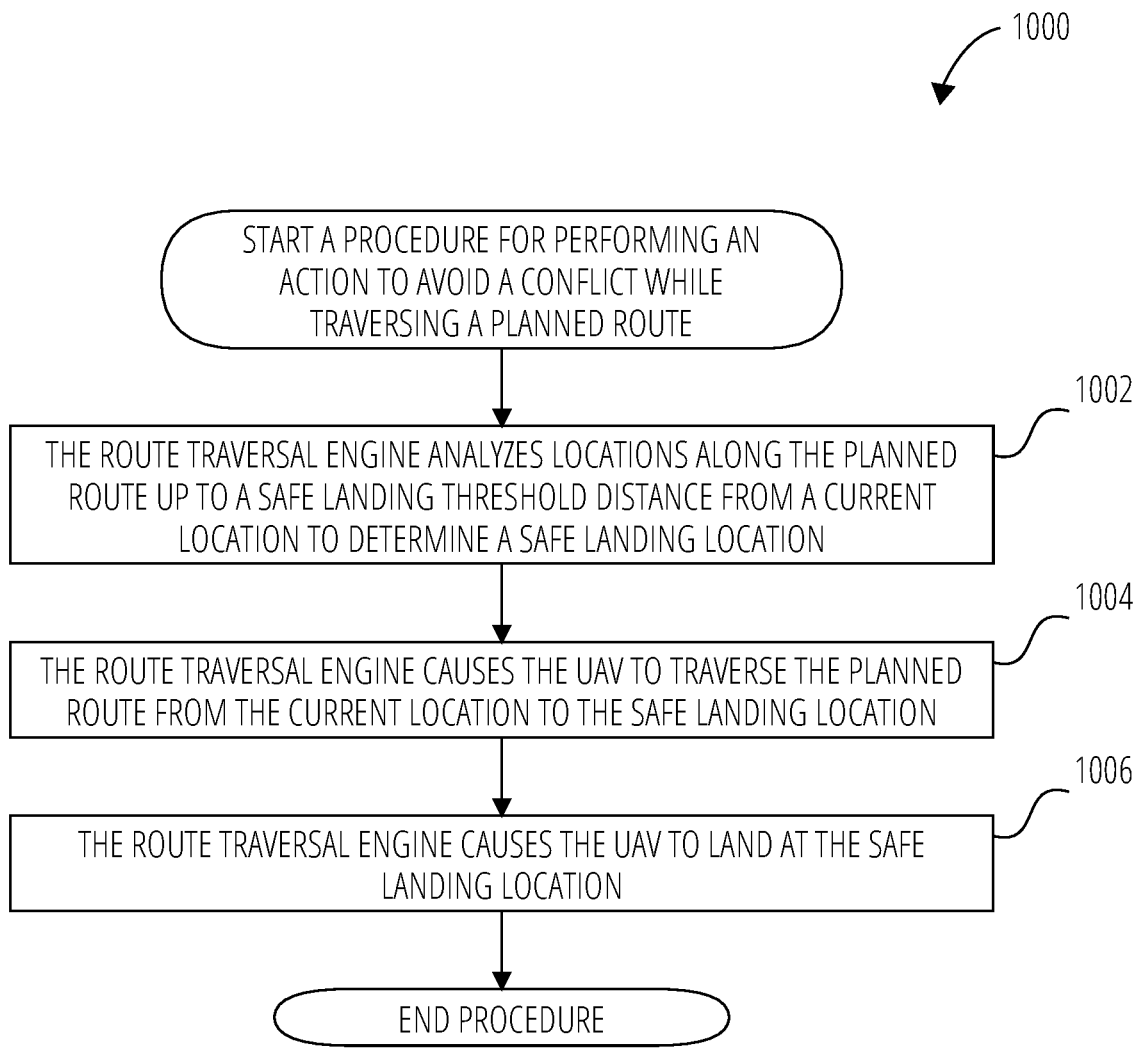
FIG. 10 is a flowchart that illustrates a non-limiting example embodiment of a procedure for performing an action to avoid a conflict while traversing a planned route according to various aspects of the present disclosure.

FIG. 10 is a flowchart that illustrates a non-limiting example embodiment of a procedure for performing an action to avoid a conflict while traversing a planned route according to various aspects of the present disclosure. The procedure 1000 is a non-limiting example of a procedure suitable for use at subroutine block 414 of method 400 as described above. One aspect of the procedure 1000 is that the technique disclosed is designed to avoid all types of conflicts detected by the techniques used in the method 400. As such, further consideration of the trajectory of the intruder aircraft 602 is not needed to avoid the conflict. Another aspect of the procedure 1000 is that instead of landing immediately, the UAV 100 finds a safe landing location within its planned route 504. This allows the UAV 100 to remain within flight volumes that were reserved for the UAV 100 by the fleet management system, and so conflicts with other UAVs in within the fleet also do not have to be considered, but also allows the UAV 100 to avoid unsafe landing locations within its planned route 504.

From a start block, the procedure 1000 advances to block 1002, where the route traversal engine 316 analyzes locations along the planned route up to a safe landing threshold distance from a current location to determine a safe landing location. In some embodiments, the safe landing threshold distance may be chosen to balance an increased likelihood of being able to find a safe landing location (due to the larger distance to be searched) versus avoiding a greater number of conflicts (due to the increased safety margins needed to support the larger safe landing threshold distance). In some embodiments, the safe landing threshold distance may be selected to be longer than any known object to be avoided along the planned route. In some embodiments, a distance of 45 meters may be used in order to provide the ability to avoid common obstacles, though in some embodiments, other distances may be used. In some embodiments, the planned route may be designed by the fleet management system to avoid any locations where traveling a distance of further than the safe landing threshold distance would be required to find a safe landing location.

In some embodiments, if a safe landing location cannot be determined along the planned route before the safe landing threshold distance, a point at the safe landing threshold distance may be used as the safe landing location. This action assumes that the worst case outcome is a mid-air collision, and so allowing a landing at a location that constitutes a higher risk of ground-based danger is preferable to the danger involved with failing to avoid the possibility of a mid-air collision (which would, itself, pose ground-based danger).

To find a safe landing location, the route traversal engine 316 may search for locations along the planned route that are free from specific types of obstacles. As one non-limiting example, the route traversal engine 316 may search for locations along the planned route that are not a street, highway, or other type of road. As another non-liming example, the route traversal engine 316 may search for locations along the planned route that are not bodies of water, parking lots, buildings, or other types of unsafe landing locations instead of or in addition to searching for roads. In some embodiments, the route traversal engine 316 may analyze locations along the planned route using an internally stored map that identifies unsafe landing locations. In some embodiments, the route traversal engine 316 may analyze locations along the planned route using images obtained from a camera sensor device 304 by using computer vision techniques to classify locations depicted in the images into safe landing locations or unsafe landing locations (e.g., whether or not locations along the planned route include types of objects to be avoided, such as roads, buildings, or bodies of water).

At block 1004, the route traversal engine 316 causes the UAV 100 to traverse the planned route from the current location to the safe landing location, and at block 1006, the route traversal engine 316 causes the UAV 100 to land at the safe landing location. In some embodiments, the route traversal engine 316 may cause the UAV 100 to decelerate to a stop above the safe landing location, and then to descend vertically to the safe landing location. This vertical descent path allows the route traversal engine 316 to avoid having to determine whether a ramped in (e.g., slanted) trajectory to the safe landing location would intersect with any additional above-grade obstacles (e.g., trees, power lines, buildings, etc.), thus increasing safety while reducing the processing burden on the route traversal engine 316. In some embodiments, other routes to the safe landing location may be used, including but not limited to slanted routes to the safe landing location.

The procedure 1000 then advances to an end block and returns control to its caller.

Figure 11:
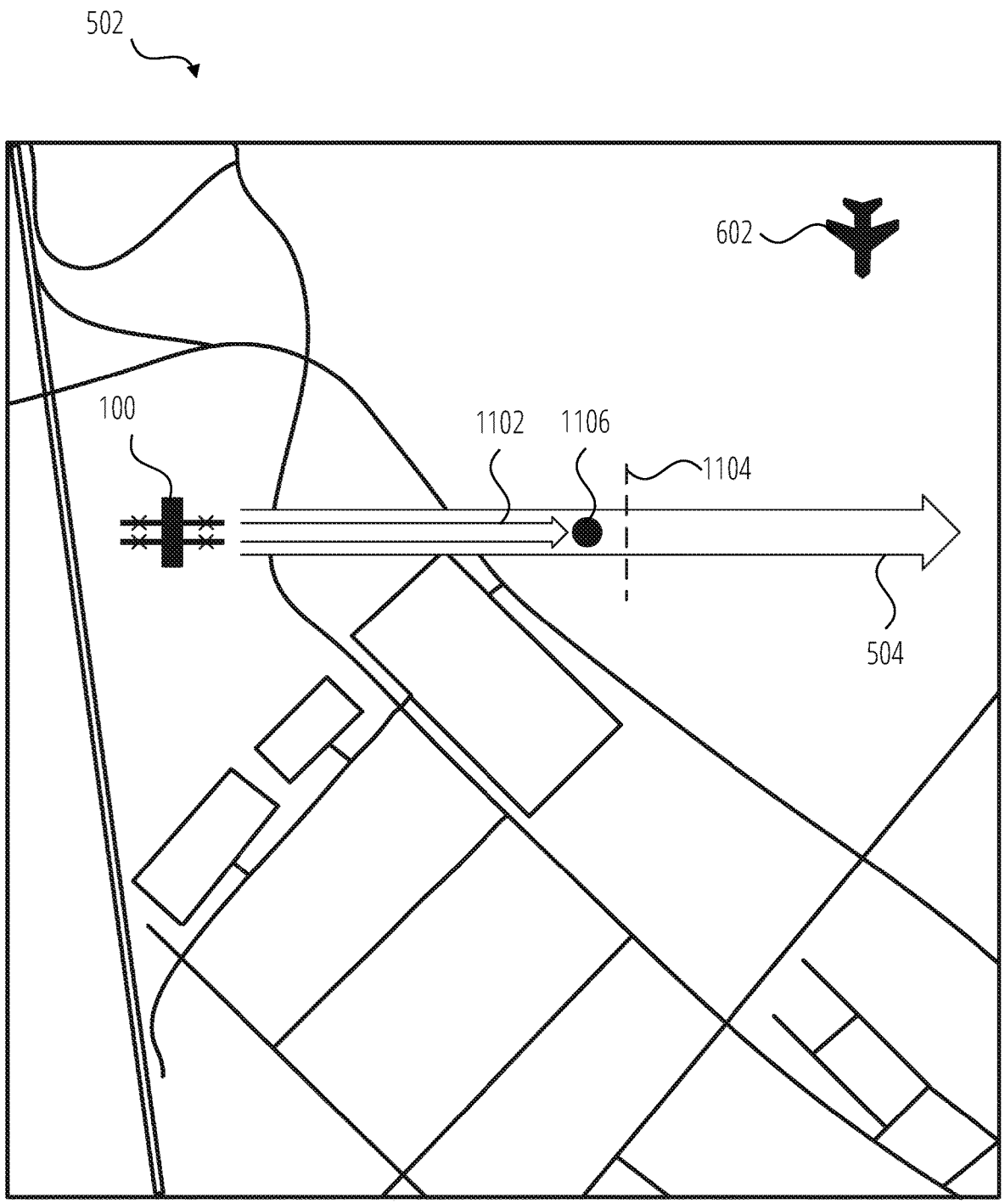
FIG. 11 is a schematic drawing that illustrates a non-limiting example embodiment of the technique for avoiding a conflict described in FIG. 10.

FIG. 11 is a schematic drawing that illustrates a non-limiting example embodiment of the technique for avoiding a conflict described in FIG. 10. In FIG. 11, the UAV 100 has detected an actual conflict with the intruder aircraft 602, and is taking action to avoid the conflict. The route traversal engine 316 searches along the planned route 504 to find a safe landing location. The route traversal engine 316 is searching along the planned route 504 up to but not past a safe landing threshold distance 1104. As is shown, the planned route 504 crosses several roads, and so the first safe landing location found by the UAV 100 along the planned route 504 is the illustrated safe landing location 1106. Accordingly, the UAV 100 proceeds along the continued planned route 1102 until coming to a stop over the safe landing location 1106. The UAV 100 then lands at the safe landing location 1106, thus avoiding the conflict with the intruder aircraft 602.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of an unmanned aerial vehicle (UAV), causes the UAV to perform actions comprising:
   receiving at least one ADS-B message from an intruder aircraft;
   generating an intruder location prediction based on the at least one ADS-B message;
   comparing the intruder location prediction for the intruder aircraft to an ownship location prediction for the UAV to detect conflicts; and
   in response to detecting a conflict between the intruder location prediction and the ownship location prediction:
      determining a safe landing location along a planned route for the UAV; and
      descending to land at the safe landing location;
   wherein the ownship location prediction for the UAV is based on at least a current location of the UAV, a planned route being traversed, and a prediction of windspeed experienced by the UAV.

2. The non-transitory computer-readable medium of claim 1, wherein generating the intruder location prediction based on the at least one ADS-B message includes:
   determining a first location based on a first ADS-B message;
   determining a second location based on a second ADS-B message; and
   generating the intruder location prediction based on a line extending through the first location and the second location.

3. The non-transitory computer-readable medium of claim 1, wherein generating the intruder location prediction based on the at least one ADS-B message includes:
   determining a location, a heading, an airspeed, and a climb rate based on a first ADS-B message; and
   generating the intruder location prediction based on the location, the heading, the airspeed, and the climb rate.

4. The non-transitory computer-readable medium of claim 3, wherein generating the intruder location prediction based on the location, the heading, the airspeed, and the climb rate includes determining a reachable volume based on the location, the heading, the airspeed, and the climb rate.

5. The non-transitory computer-readable medium of claim 1, wherein generating the intruder location prediction based on the at least one ADS-B message includes:
   determining a location based on a first ADS-B message; and
   determining probabilities of the intruder aircraft being at respective locations within a first prediction volume.

6. The non-transitory computer-readable medium of claim 5, wherein the actions further comprise generating the ownship location prediction to include probabilities of the UAV being at respective locations within a second prediction volume; and
   wherein comparing the intruder location prediction to the ownship location prediction to detect conflicts includes:
      determining an overlapping portion of the first prediction volume and the second prediction volume;
      combining the probabilities within the overlapping portion of the first prediction volume with the probabilities within the overlapping portion of the second prediction volume; and
      comparing the combined probabilities to a predetermined threshold.

7. The non-transitory computer-readable medium of claim 1, wherein comparing the intruder location prediction to the ownship location prediction to detect conflicts includes:
    conducting a comparison of the intruder location prediction to the ownship location prediction at a first level of detail; and
    in response to detecting a conflict in the first level of detail, conducting a comparison of the intruder location prediction to the ownship location prediction at a second level of detail.

8. The non-transitory computer-readable medium of claim 7, wherein the comparison at the first level of detail includes updating the intruder location prediction and the ownship location prediction at a first rate, and wherein the comparison at the second level of detail includes updating the intruder location prediction and the ownship location prediction at a second rate faster than the first rate.

9. The non-transitory computer-readable medium of claim 7, wherein conducting the comparison of the intruder location prediction to the ownship location prediction at the first level of detail includes determining whether a volume of the intruder location prediction intersects with a volume of the ownship location prediction; and
    wherein conducting the comparison of the intruder location prediction to the ownship location prediction at the second level of detail includes:
        determining a first predicted location for the intruder aircraft at one or more points in time;
        determining a second predicted location for the UAV at the one or more points in time; and
        determining whether the first predicted location and the second predicted location are in conflict at any of the one or more points in time.

10. The non-transitory computer-readable medium of claim 7, wherein conducting the comparison of the intruder location prediction to the ownship location prediction at the first level of detail includes:
    determining a first predicted location for the intruder aircraft at a first plurality points in time;
    determining a second predicted location for the UAV at the first plurality of points in time; and
    determining whether the first prediction location and the second location are in conflict at any of the first plurality of points in time;
    wherein conducting the comparison of the intruder location prediction to the ownship location prediction at the second level of detail includes:
        determining a third predicted location for the intruder aircraft at a second plurality of points in time;
        determining a fourth prediction location for the UAV at the second plurality of points in time; and
        determining whether the third predicted location and the fourth predicted location are in conflict at any of the second plurality of points in time;
    wherein the first plurality of points in time are farther apart from each other than the second plurality of points in time.

11. An unmanned aerial vehicle (UAV), comprising:
    an ADS-B receiver device;
    a first set of processing cores;
    a second set of processing cores; and
    at least one non-transitory computer-readable medium having logic stored thereon that, in response to execution by the first set of processing cores, causes the first set of processing cores to execute a route traversal engine to autonomously control one or more propulsion devices of the UAV; and
    at least one non-transitory computer-readable medium having logic stored thereon that, in response to execution by the second set of processing cores, causes the second set of processing cores to perform actions for predicting and avoiding collisions between the UAV and an intruder aircraft, the actions comprising:
        receiving, via the ADS-B receiver device, at least one ADS-B message from the intruder aircraft;
        generating an intruder location prediction based on the at least one ADS-B message;
        comparing the intruder location prediction for the intruder aircraft to an ownship location prediction for the UAV to detect conflicts; and
        in response to detecting a conflict between the intruder location prediction and the ownship location prediction, transmitting a notification of the conflict to the route traversal engine;
    wherein the ownship location prediction for the UAV is based on at least a current location of the UAV, a planned route being traversed, and a prediction of windspeed experienced by the UAV.

12. The UAV of claim 11, wherein generating the intruder location prediction based on the at least one ADS-B message includes:
    determining a first location based on a first ADS-B message;
    determining a second location based on a second ADS-B message; and
    generating the intruder location prediction based on a line extending through the first location and the second location.

13. The UAV of claim 11, wherein generating the intruder location prediction based on the at least one ADS-B message includes:
    determining a location, a heading, an airspeed, and a climb rate based on a first ADS-B message; and
    generating the intruder location prediction based on the location, the heading, the airspeed, and the climb rate.

14. The UAV of claim 13, wherein generating the intruder location prediction based on the location, the heading, the airspeed, and the climb rate includes determining a reachable volume based on the location, the heading, the airspeed, and the climb rate.

15. The UAV of claim 11, wherein generating the intruder location prediction based on the at least one ADS-B message includes:
    determining a location based on a first ADS-B message; and
    determining probabilities of the intruder aircraft being at respective locations within a first prediction volume.

16. The UAV of claim 15, wherein the actions further comprise generating the ownship location prediction to include probabilities of the UAV being at respective locations within a second prediction volume; and
    wherein comparing the intruder location prediction to the ownship location prediction to detect conflicts includes:
        determining an overlapping portion of the first prediction volume and the second prediction volume;
        combining the probabilities within the overlapping portion of the first prediction volume with the probabilities within the overlapping portion of the second prediction volume; and
        comparing the combined probabilities to a predetermined threshold.

17. The UAV of claim 11, wherein comparing the intruder location prediction to the ownship location prediction to detect conflicts includes:
conducting a comparison of the intruder location prediction to the ownship location prediction at a first level of detail; and
in response to detecting a conflict in the first level of detail, conducting a comparison of the intruder location prediction to the ownship location prediction at a second level of detail.

18. The UAV of claim 17, wherein the comparison at the first level of detail includes updating the intruder location prediction and the ownship location prediction at a first rate, and wherein the comparison at the second level of detail includes updating the intruder location prediction and the ownship location prediction at a second rate faster than the first rate.

19. The UAV of claim 17, wherein conducting the comparison of the intruder location prediction to the ownship location prediction at the first level of detail includes determining whether a volume of the intruder location prediction intersects with a volume of the ownship location prediction; and
wherein conducting the comparison of the intruder location prediction to the ownship location prediction at the second level of detail includes:
determining a first predicted location for the intruder aircraft at one or more points in time;
determining a second predicted location for the UAV at the one or more points in time; and
determining whether the first predicted location and the second predicted location are in conflict at any of the one or more points in time.

20. The UAV of claim 17, wherein conducting the comparison of the intruder location prediction to the ownship location prediction at the first level of detail includes:
determining a first predicted location for the intruder aircraft at a first plurality points in time;
determining a second predicted location for the UAV at the first plurality of points in time; and
determining whether the first prediction location and the second location are in conflict at any of the first plurality of points in time;
wherein conducting the comparison of the intruder location prediction to the ownship location prediction at the second level of detail includes:
determining a third predicted location for the intruder aircraft at a second plurality of points in time;
determining a fourth prediction location for the UAV at the second plurality of points in time; and
determining whether the third predicted location and the fourth predicted location are in conflict at any of the second plurality of points in time;
wherein the first plurality of points in time are farther apart from each other than the second plurality of points in time.

* * * * *